US008812993B2

(12) United States Patent
Goertz

(10) Patent No.: US 8,812,993 B2
(45) Date of Patent: Aug. 19, 2014

(54) USER INTERFACE

(75) Inventor: Magnus Goertz, Lidingo (SE)

(73) Assignee: Neonode Inc., Santa Clara, CA (US)

( * ) Notice: Subject to any disclaimer, the term of this patent is extended or adjusted under 35 U.S.C. 154(b) by 0 days.

(21) Appl. No.: 13/310,755

(22) Filed: Dec. 4, 2011

(65) Prior Publication Data

US 2012/0094723 A1 Apr. 19, 2012

Related U.S. Application Data

(63) Continuation of application No. 10/315,250, filed on Dec. 10, 2002, now Pat. No. 8,095,879.

(51) Int. Cl.
*G06F 3/00* (2006.01)
*G06F 3/0481* (2013.01)
*G06F 3/0488* (2013.01)

(52) U.S. Cl.
CPC ............ *G06F 3/0488* (2013.01); *G06F 3/0481* (2013.01)
USPC ............................. 715/863; 715/764; 715/864

(58) Field of Classification Search
USPC .......................................... 715/863, 864, 764
See application file for complete search history.

(56) References Cited

U.S. PATENT DOCUMENTS

| 4,243,879 A | 1/1981 | Carroll et al. |
| 4,301,447 A | 11/1981 | Funk et al. |
| 4,790,028 A | 12/1988 | Ramage |
| 4,847,606 A | 7/1989 | Beiswenger |
| 5,036,187 A | 7/1991 | Yoshida et al. |
| 5,053,758 A | 10/1991 | Cornett et al. |
| 5,194,863 A | 3/1993 | Barker et al. |
| 5,283,558 A | 2/1994 | Chan |
| 5,305,435 A * | 4/1994 | Bronson ....................... 715/777 |
| 5,406,307 A * | 4/1995 | Hirayama et al. ............. 715/800 |
| 5,463,725 A | 10/1995 | Henckel et al. |
| 5,561,758 A | 10/1996 | Hocker et al. |
| 5,577,733 A | 11/1996 | Downing |
| 5,594,471 A * | 1/1997 | Deeran et al. .................. 345/173 |
| 5,603,053 A * | 2/1997 | Gough et al. ...................... 710/5 |
| 5,612,719 A | 3/1997 | Beernink et al. |
| 5,618,232 A | 4/1997 | Martin |
| 5,644,628 A * | 7/1997 | Schwarzer et al. ........ 379/93.19 |

(Continued)

FOREIGN PATENT DOCUMENTS

| EP | 0 330 767 B1 | 9/1989 |
| EP | 0513694 A2 | 11/1992 |

(Continued)

OTHER PUBLICATIONS

Carlson, Jeff, Visual Quickstart Guide Palm Organizers. Peachpit Press. 2000. Berkeley, CA. pp. xiii, 12, 25, 26, 28-30, 40, 47, 246 and 253.

(Continued)

*Primary Examiner* — Ryan Pitaro
(74) *Attorney, Agent, or Firm* — Soquel Group LLC

(57) ABSTRACT

A non-transitory computer readable medium storing computer program code which, when executed by a mobile handheld device that has a touch sensitive display, instructs the device (i) to display a notification of an incoming phone call, and (ii) to accept the call in response to a mufti-step operation comprising an object touching the touch sensitive display, and the object gliding along the touch sensitive display in a specific direction.

8 Claims, 4 Drawing Sheets

(56) References Cited

U.S. PATENT DOCUMENTS

| | | | |
|---|---|---|---|
| 5,745,116 A | 4/1998 | Pisutha-Arnond | |
| 5,748,185 A | 5/1998 | Stephan et al. | |
| 5,785,439 A | 7/1998 | Bowen | |
| 5,821,930 A | 10/1998 | Hansen | |
| 5,821,933 A | 10/1998 | Keller et al. | |
| 5,825,352 A | 10/1998 | Bisset et al. | |
| 5,889,236 A | 3/1999 | Gillespie et al. | |
| 5,898,434 A | 4/1999 | Small et al. | |
| 5,900,875 A | 5/1999 | Haitani et al. | |
| 5,907,327 A * | 5/1999 | Ogura et al. | 715/764 |
| 5,914,709 A | 6/1999 | Graham et al. | |
| 5,943,039 A | 8/1999 | Anderson et al. | |
| 5,943,044 A | 8/1999 | Martinelli et al. | |
| 5,956,030 A | 9/1999 | Conrad et al. | |
| 5,988,645 A | 11/1999 | Downing | |
| 6,037,937 A | 3/2000 | Beaton et al. | |
| 6,052,279 A | 4/2000 | Friend et al. | |
| 6,085,204 A | 7/2000 | Chijiwa et al. | |
| 6,088,032 A * | 7/2000 | Mackinlay | 715/848 |
| 6,292,179 B1 | 9/2001 | Lee | |
| 6,304,261 B1 | 10/2001 | Shields et al. | |
| 6,310,610 B1 | 10/2001 | Beaton et al. | |
| 6,340,979 B1 | 1/2002 | Beaton et al. | |
| 6,346,935 B1 | 2/2002 | Nakajima et al. | |
| 6,356,287 B1 | 3/2002 | Ruberry et al. | |
| 6,529,920 B1 | 3/2003 | Arons et al. | |
| 6,542,191 B1 | 4/2003 | Yonezawa | |
| 6,549,217 B1 * | 4/2003 | De Greef et al. | 715/745 |
| 6,573,883 B1 * | 6/2003 | Bartlett | 345/156 |
| 6,597,345 B2 | 7/2003 | Hirshberg | |
| 6,618,063 B1 | 9/2003 | Kurtenbach | |
| 6,639,584 B1 | 10/2003 | Li | |
| 6,646,633 B1 | 11/2003 | Nicolas | |
| 6,664,983 B2 | 12/2003 | Ludoplh | |
| 6,690,365 B2 | 2/2004 | Hinckley et al. | |
| 6,690,387 B2 | 2/2004 | Zimmerman et al. | |
| 6,707,449 B2 | 3/2004 | Hinckley et al. | |
| 6,727,917 B1 | 4/2004 | Chew et al. | |
| 6,734,883 B1 | 5/2004 | Wynn et al. | |
| 6,757,001 B2 * | 6/2004 | Allport | 715/840 |
| 6,757,002 B1 * | 6/2004 | Oross et al. | 715/864 |
| 6,765,559 B2 | 7/2004 | Hayakawa | |
| 6,788,292 B1 | 9/2004 | Nako et al. | |
| 6,812,940 B2 * | 11/2004 | Arnold | 715/817 |
| 6,833,827 B2 | 12/2004 | Lui et al. | |
| 6,874,683 B2 | 4/2005 | Keronen et al. | |
| 6,925,611 B2 | 8/2005 | SanGiovanni | |
| 6,988,246 B2 | 1/2006 | Kopitzke et al. | |
| 7,006,077 B1 | 2/2006 | Uusimaki | |
| 7,007,239 B1 * | 2/2006 | Hawkins et al. | 715/780 |
| 7,030,861 B1 | 4/2006 | Westerman et al. | |
| 7,046,232 B2 * | 5/2006 | Inagaki et al. | 345/158 |
| 7,155,683 B1 * | 12/2006 | Williams | 715/816 |
| 7,159,120 B2 * | 1/2007 | Muratov et al. | 713/182 |
| 7,159,763 B2 | 1/2007 | Yap et al. | |
| 7,199,786 B2 | 4/2007 | Suraqui | |
| 7,225,408 B2 | 5/2007 | O'Rourke | |
| 7,231,231 B2 * | 6/2007 | Kokko et al. | 455/566 |
| 7,283,845 B2 * | 10/2007 | De Bast | 455/566 |
| 7,286,063 B2 | 10/2007 | Gauthey et al. | |
| 7,304,638 B2 | 12/2007 | Murphy | |
| 7,343,565 B2 * | 3/2008 | Ying et al. | 715/780 |
| 7,441,196 B2 | 10/2008 | Gottfurcht et al. | |
| 7,450,114 B2 | 11/2008 | Anwar | |
| 7,665,043 B2 * | 2/2010 | Kho | 715/864 |
| 7,818,691 B2 * | 10/2010 | Irvine | 715/856 |
| 7,880,724 B2 | 2/2011 | Nguyen et al. | |
| 8,120,625 B2 | 2/2012 | Hinckley | |
| 8,127,141 B2 | 2/2012 | Hypponen | |
| 2001/0000668 A1 * | 5/2001 | Bodnar | 345/339 |
| 2001/0002694 A1 | 6/2001 | Nakazawa et al. | |
| 2001/0017934 A1 * | 8/2001 | Paloniemi et al. | 382/107 |
| 2001/0022579 A1 | 9/2001 | Hirabayashi | |
| 2001/0026268 A1 | 10/2001 | Ito | |
| 2001/0028344 A1 | 10/2001 | Iwamoto et al. | |
| 2001/0028365 A1 * | 10/2001 | Ludolph | 345/764 |
| 2001/0030641 A1 | 10/2001 | Suzuki | |
| 2001/0043189 A1 * | 11/2001 | Brisebois et al. | 345/156 |
| 2001/0043198 A1 | 11/2001 | Ludtke | |
| 2001/0055006 A1 | 12/2001 | Sano et al. | |
| 2002/0002326 A1 | 1/2002 | Causey, III et al. | |
| 2002/0015064 A1 * | 2/2002 | Robotham et al. | 345/863 |
| 2002/0027549 A1 | 3/2002 | Hirshberg | |
| 2002/0029341 A1 * | 3/2002 | Juels et al. | 713/184 |
| 2002/0046353 A1 | 4/2002 | Kishimoto | |
| 2002/0054153 A1 * | 5/2002 | Arnold | 345/810 |
| 2002/0060699 A1 * | 5/2002 | D'Agostini | 345/783 |
| 2002/0063696 A1 | 5/2002 | Kubo et al. | |
| 2002/0075244 A1 | 6/2002 | Tani et al. | |
| 2002/0109677 A1 | 8/2002 | Taylor | |
| 2002/0135619 A1 * | 9/2002 | Allport | 345/810 |
| 2002/0171691 A1 | 11/2002 | Currans et al. | |
| 2002/0173300 A1 * | 11/2002 | Shtivelman et al. | 455/418 |
| 2002/0191029 A1 * | 12/2002 | Gillespie et al. | 345/810 |
| 2003/0013483 A1 * | 1/2003 | Ausems et al. | 455/556 |
| 2003/0016253 A1 * | 1/2003 | Aoki et al. | 345/863 |
| 2003/0043207 A1 | 3/2003 | Duarte | |
| 2003/0076306 A1 | 4/2003 | Zadesky et al. | |
| 2003/0095102 A1 * | 5/2003 | Kraft et al. | 345/168 |
| 2003/0122787 A1 | 7/2003 | Zimmerman et al. | |
| 2003/0206162 A1 * | 11/2003 | Roberts | 345/173 |
| 2004/0001101 A1 * | 1/2004 | Trajkovic et al. | 345/781 |
| 2004/0021643 A1 | 2/2004 | Hoshino et al. | |
| 2004/0021681 A1 * | 2/2004 | Liao | 345/702 |
| 2004/0100510 A1 | 5/2004 | Milic-Frayling et al. | |
| 2004/0119763 A1 * | 6/2004 | Mizobuchi et al. | 345/863 |
| 2004/0125143 A1 | 7/2004 | Deaton et al. | |
| 2004/0141010 A1 | 7/2004 | Fitzmaurice et al. | |
| 2005/0035956 A1 | 2/2005 | Sinclair et al. | |
| 2005/0253818 A1 | 11/2005 | Nettamo | |
| 2007/0263822 A1 * | 11/2007 | Chang et al. | 379/202.01 |
| 2009/0285383 A1 * | 11/2009 | Tsuei | 379/242 |

FOREIGN PATENT DOCUMENTS

| | | |
|---|---|---|
| EP | 0618528 A1 | 10/1994 |
| EP | 0703525 A1 | 3/1996 |
| WO | 8600446 A1 | 1/1986 |
| WO | 8600447 A1 | 1/1986 |

OTHER PUBLICATIONS

Streitelmeier, Julie, "Palm m100." The Gadgeteer. 2000. <http://www.the-gadgeteer.com/review/palm_m100_review> pp. 1-8.

Venolia et al., "T-Cube: A Fast, Self-Disclosing Pen-Based Alphabet." Apr. 24, 1994. pp. 265-270.

Dulberg, et al., An Imprecise Mouse Gesture for the Fast Activation of Controls. Interact 1999. pp. 1-8.

Pogue, David, Palm Pilot: The Ultimate Guide, 2nd Edition, 1998. O'Reilly and Associates, Inc. pp. 1-17.

C. Plaisant and D. Wallace, "Touchscreen toggle design", CHI '92 Proceedings of the SIGCHI Conference on Human Factors in Computing Systems, May 3-7, 1992, pp. 667-668, ACM New York, NY, USA.

Harrison, B. L., Fishkin, K. P., Gujar. A., Mochon, C. and Want, R., Squeeze Me, Hold Me, Tilt Me! An Exploration of Manipulative User Interfaces, Proceeding of the CHI '98 Conference on Human Factors in Computing Systems, ACM, Los Angeles, CA, Apr. 18-23, 1998, pp. 17-24.

Kurtenbach, G. P., Sellen, A. J. and Buxton, W. A. S., An Empirical Evaluation of Some Articulatory and Cognitive Aspects of Marking Menus, Human-Computer Interaction, vol. 8, Issue 1, L. Erlbaum Associates Inc., Hillsdale, NJ, Mar. 1993, pp. 1-23.

MacKenzie, I. S. and Soukoreff, R W., Text Entry for Mobile Computing: Models and Methods, Theory and Practice, Human-Computer Interaction, L. Erlbaum Associates Inc. Hillsdale, NJ, 2002, vol. 17, pp. 147-198.

Mynatt, E. D., Igarashi, T., Edwards, W. K. and LaMarca, A., Flatland: New Dimensions in Office Whiteboards, Proceeding of the CHI '99 Conference on Human Factors in Computing Systems, ACM, New York, NY, May 15-20, 1999, pp. 346-353.

(56) References Cited

OTHER PUBLICATIONS

Bier, E. A., Fishkin, K., Pier, K. and Stone, M. C., A Taxonomy of See-Through Tools: The Video, Proceeding of the CHI '95 Mosaic of Creativity, ACM, New York, NY, May 7-11, 1995, pp. 411-412.
Bier, E. A., Stone, M. C., Fishkin, K., Buxton, W. and Baudel, T., A Taxonomy of See-Through Tools, Conference on Human Factors in Computing Systems, CHI '94, Boston, MA, ACM, New York, NY, Apr. 24-28, 1994, pp. 358-364.
Damm, C. H., Hansen, K. M. and Thomsen, M., Tool Support for Cooperative Object-Oriented Design: Gesture Based Modeling on an Electronic Whiteboard, Proceeding of the CHI '00 Conference on Human Factors in Computing Systems, ACM, New York, NY, Apr. 1-6, 2000, pp. 518-525.
Jermyn, I., Mayer, A., Monrose, F., Reiter, M. K. and Rubin, A. D., The Design and Analysis of Graphical Passwords, Proceedings of the 8th USENIX Security Symposium, Washington, D.C., USA, Aug. 23-26, 1999.
Kurtenbach, G. and Buxton, W., Gordon Kurtenbach and William Buxton, The Limits of Expert Performance Using Hierarchic Marking Menus, Proceedings from INTERCHI 93—Conference on Human Factors in Computing Systems, ACM, New York, NY, Apr. 24-29, 1993, pp. 482-487.
Pirhonen, A., Brewster, S. and Holguin, C., Gestural and Audio Metaphors as a Means of Control for Mobile Devices, Proceedings of the SIGCHI Conference on Human Factors in Computing Systems: Changing our World, Changing Ourselves, ACM New York, NY, pp. 291-298.
SwitchHack 1.62",Jan. 17, 2001, downloaded from http://web.archive.org/web/200101170650/http://www.deskfree.com/switchhack.html.
swipe_readme.txt, May 8, 2001, downloaded in swipe.zip from http://web.archive.org/web/20010508013439/http://www.samsungshop.co.yu/palm/swipe.zip.
"Desk Accessories",Oct. 18, 2000, downoaded from http://web.archive.org/web/20001018025151/http://www.doublebang.com/resources/da.html.
"Launch 'em 1.53", Dec. 11, 1998, downloaded from http://www.5star-shareware.com/PDA/Palm/Utilities/launchem.html.
Pogue, David, Palm Pilot: The Ultimate Guide, 2nd Edition, 1999, O'Reilly and Associates, Inc., pp. 19, 27-36, 38-47, 80, 113, 494, 507, 509, 519-520.
Brad A. Myers, "Mobile Devices for Control", Mobile HCI 2002, F. Paterno (Ed.), LNCS 2411, pp. 1-8, 2002. SpringerVerlag, Berlin, Heidelberg.
Brad A. Myers, Kin Pou Lie and Bo-Chieh Yang, "Two-Handed Input Using a PDA and a Mouse", CHI '2000, Apr. 1-6, 2000, CHI Letters, vol. 2, Issue 1, pp. 41-48, 2000, ACM, New York, NY, USA.
Brad A. Myers, "Using Handhelds and PCs Together", Communications of the ACM, Nov. 2001, vol. 44, No. 11, pp. 34-41, ACM, New York, NY, USA.
Gordon Kurtenbach and William Buxton, "User Learning and Performance with Marking Menus", CHI '94 Proceedings of the SIGCHI Conference on Human factors in Computing Systems, pp. 258-264, ACM, New York, NY, USA.
Gordon Paul Kurtenbach, "The Design and Evaluation of Marking Menus", 1993. Doctoral Thesis, Graduate Department of Computer Science, University of Toronto.
David A. Carr, "Specification of Interface Interaction Objects", CHI '94 Proceedings of the SIGCHI Conference on Human factors in Computing Systems, pp. 372-378, 1994, ACM, New York, NY, USA.
David A. Carr, Ninad Jog, Harsha Prem Kumar, Marko Teittinen and Christopher Ahlberg, "Using Interaction Object Graphs to Specify Graphical Widgets", Tech. Rep. ISR-TR-94-69, Sep. 1994, Institute for Systems Research, University of Maryland, College Park, MD.
Catherine Plaisant and Daniel Wallace, "Touchscreen Toggle Switches: Push or Slide? Design Issues and Usability Study", Tech. Rep. CAR-TR-521, Nov. 1990, Human-Computer Interaction Laboratory,Center for Automation Research, Dept. of Psychology, University of Maryland, College Park, MD.
Mark A. Tapia and Gordon Kurtenbach, "Some Design Refinements and Principles on the Appearance and Behavior of Marking Menus", UIST '95, pp. 189-195, ACM New York, NY, USA.
Michael McGuffin, Nicolas Burtnyk and Gordon Kurtenbach, "FaST Sliders: Integrating Marking Menus and the Adjustment of Continuous Values", Proc. Graphics Interface, May 2002, pp. 35-42.
Harrison, Beverly L., Fishkin, Kenneth P., Gujar, Anuj, Mochon, Carlos and Want, Roy, Squeeze Me, Hold Me, Tilt Me! An Exploration of Manipulative User Interfaces, Proceeding of the CHI '98 Conference on Human Factors in Computing Systems, Apr. 18-23, 1998, pp. 17-24, ACM, Los Angeles, CA.
Kurtenbach, Gordon P., Sellen, Abigail J. and Buxton, William A. S., An Empirical Evaluation of Some Articulatory and Cognitive Aspects of Marking Menus, Human-Computer Interaction, vol. 8, Issue 1, Mar. 1993, pp. 1-23, L. Erlbaum Associates Inc., Hillsdale, NJ.
MacKenzie, I. Scott and Soukoreff, William, Text Entry for Mobile Computing: Models and Methods, Theory and Practice, Human-Computer Interaction, 2002, vol. 17, pp. 147-198, L. Erlbaum Associates Inc., Hillsdale, NJ.
Mynatt, Elizabeth D., Igarashi, Takeo, Edwards, W. Keith and LaMarca, Anthony, Flatland: New Dimensions in Office Whiteboards, Proceeding of the CHI '99 Conference on Human Factors in Computing Systems, May 15-20, 1999, pp. 346-353, ACM, Pittsburgh, PA.
Bier, Eric A., Fishkin, Ken, Pier, Ken and Stone, Maureen C., A Taxonomy of See-Through Tools: The Video, Proceeding of the CHI '95 Mosaic of Creativity, May 7-11, 1995, pp. 411-412, ACM, Denver, CO.
Bier, Eric A., Stone, Maureen C., Fishkin, Ken, Buxton, William and Baudel, Thomas, A Taxonomy of See-Through Tools, Conference on Human Factors in Computing Systems, CHI 1994, Boston, MA, Apr. 24-28, 1994, Proceedings, pp. 358-364. ACM, New York, NY.
Damm, Christian Heide, Hansen, Klaus Marius and Thomsen, Michael, Tool Support for Cooperative Object-Oriented Design: Gesture Based Modeling on an Electronic Whiteboard, Proceeding of the CHI '00 Conference on Human Factors in Computing Systems, Apr. 1-6, 2000, pp. 518-525, ACM, New York, NY.
Jermyn, Ian, Mayer Alain, Monrose, Fabian, Reiter, Michael K. and Rubin, Aviel D., The Design and Analysis of Graphical Passwords, Proceedings of the 8th USENIX Security Symposium, Washington, D.C., USA, Aug. 23-26, 1999.
Kenwood KVT-911DVD Instruction Manual, 2001, Japan.
Kurtenbach, Gordon and Buxton, William, The Limits of Expert Performance Using Hierarchic Marking Menus, Proceedings from INTERCHI 93—Conference on Human Factors in Computing Systems, pp. 482-487, ACM, New York, NY.
Pirhonen, Antti, Brewster, Stephen and Holguin, Christopher, Gestural and Audio Metaphors as a Means of Control for Mobile Devices, Proceedings of the SIGCHI conference on Human factors in computing systems: Changing Our World, Changing Ourselves, pp. 291-298, ACM New York, NY.
Launch 'em 3.02, Oct. 8, 2001, Synergy Solutions Inc., pp. 1-20.
Launch 'em, Synergy Solutions Inc., Oct. 8, 2001.

* cited by examiner

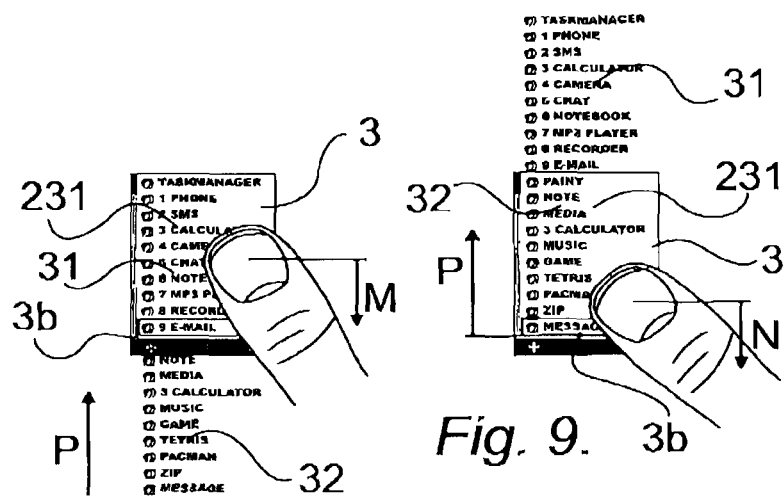
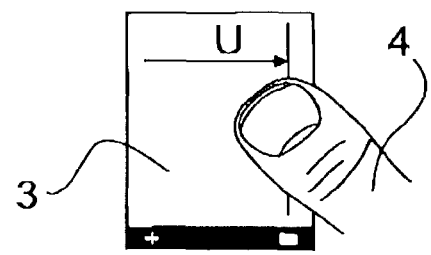
Fig. 9.
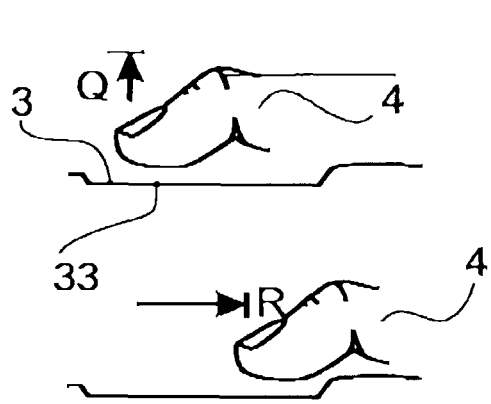
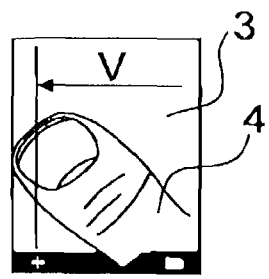
Fig. 11.
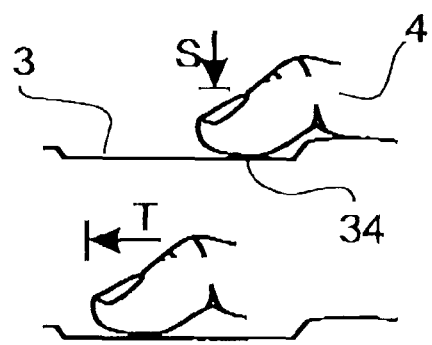
Fig. 10.
Fig. 12.

USER INTERFACE

PRIORITY REFERENCE TO RELATED APPLICATIONS

This application is a continuation of U.S. application Ser. No. 10/315,250, entitled USER INTERFACE FOR MOBILE HANDHELD COMPUTER UNIT, filed on Dec. 10, 2002 now U.S. Pat. No. 8,095,879 by inventor Magnus George Goertz.

TECHNICAL FIELD

The present invention relates to a user interface for a mobile handheld computer unit, which computer unit comprises a touch sensitive area, and which touch sensitive area is divided into a menu area and a display area.

The computer unit is adapted to run several applications simultaneously and to present any active application on top of any other application on the display area.

The present invention also relates to an enclosure for a handheld computer unit

The present invention also relates to a computer readable medium. A computer program product with computer program code is stored within the computer readable medium, which code, when read by a computer, will make it possible for this computer to present a user interface according to the invention.

DESCRIPTION OF BACKGROUND ART

Mobile handheld computers are known in various embodiments. One kind of handheld computer is the personal digital assistant (PDA), which is getting more and more powerful.

Another kind of handheld computer unit is the mobile phone, which also is getting more and more powerful. There are also examples of where the mobile phone and the PDA are merging into one unit.

A third kind of handheld computer is the laptop computer, which is getting smaller and smaller, even competing in size with the PDA's.

The need to manage more information has led the development towards new solutions regarding user interfaces and navigation. The PDA's and mobile phones are getting larger and larger in order to provide a user-friendly interface.

Since the users have gotten used to small handheld units, it is hard to move towards larger units. This has led to foldable keyboards, different kinds of joy sticks and different kinds of touch sensitive displays and pads intended to help in providing a user interface that is suitable for small handheld computer units.

SUMMARY OF THE PRESENT INVENTION

Technical Problems

It is a problem to provide a user-friendly interface that is adapted to handle a large amount of information and different kinds of traditional computer-related applications on a small handheld computer unit.

It is a problem to provide a user interface that is simple to use, even for inexperienced users of computers or handheld devices.

It is a problem to provide a small handheld computer unit with an easily accessible text input function.

It is also a problem to provide a simple way to make the most commonly used functions for navigation and management available in the environment of a small handheld computer unit.

Solution

Taking these problems into consideration, and with the staring point from a user interface for a mobile handheld computer unit, which computer unit comprises a touch sensitive area, which touch sensitive area is divided into a menu area and a display area, which computer unit is adapted to run several applications simultaneously and to present an active application on top of any other application on the display area, the present invention teaches that the menu area is adapted to present a representation of a first, a second and a third predefined function, where the first function is a general application dependent function, the second function is a keyboard function, and the third function is a task and file manager. The present invention also teaches that any one of these three functions can be activated when the touch sensitive area detects a movement of an object with its starting point within the representation of the function on the menu area and with a direction from the menu area to the display area.

With the purpose of providing a simple way of managing any application or the operations system, the present invention teaches that if the first function is activated, the display area is adapted to display icons representing services or settings, depending on the current active application. One of the icons always represents a "help"-service, regardless of application. The icons are adapted to represent services or settings of the operations system of said computer unit, such as background picture, clock, users, help, etc. if no application is currently active on the computer unit.

Selections of preferred service or setting is done by tapping on corresponding icon With the purpose of providing the access to a text input function in any application in the computer unit, the present invention teaches that when the second function is activated, the display area is adapted to display a keyboard and a text field, If a text passage in an active application is highlighted, then this text passage is displayed in the text field for editing through the keyboard and that the highlighted text passage is replaced by the edited text passage when the second function is deactivated.

If no text passage in an active application is highlighted, then the text field is available for inputting and editing of text through the keyboard.

In the case of the latter the first function can be activated, or the second function can be closed, in which a choice of saving or deleting the inputted text is given. The choice of saving the inputted text results in an activation of the first function. In this case the first function will present services or settings available for the inputted text, such as saving the inputted text for later use, using the inputted text as telephone number in a telephone application, or sending the inputted text as message in communications application.

In order to provide a task and file management in a user interface for a handheld mobile computer, the present invention teaches that, if the third function is activated, the display area is adapted to display a list with a library of available applications and files on the computer unit. A selection of an application will start the application, and a selection of a file will open the file in an application intended for the file.

A selection of an application or a file is done by moving the object so that the representation of desired application or file is highlighted, removing the object from the touch sensitive area, and then tapping on the touch sensitive area.

According to the present invention a navigation in the list is performed by moving the object in a direction towards the top of the list or towards the bottom of the list. This will cause the marking to move in the same direction. The speed of the movement of the marking is lower than the speed of the movement of the object, with the purpose of making the navigation easier.

The user interface of the present invention is specifically adapted to be used with a small computer unit where the size of the touch sensitive area is in the order of 2-3 inches. The user interface is also adapted to be operated by one hand, where the object can be a finger, such as the thumb, of a user of the computer unit.

Advantages

Those advantages that can be primarily associated with a user interface or a computer readable medium according to the present invention reside in the ability to establish a user-friendly interface for small handheld computers, both regarding general application set-up functions, text input functions, and file and task management.

BRIEF DESCRIPTION OF THE DRAWINGS

The present invention will now be described in more detail with reference to the accompanying drawings, in which

FIG. 9 is a schematic illustration of how the content of the display are is changed;

FIG. 10 is a schematic side view further illustrating how navigation is performed;

FIG. 11 is a schematic illustration of moving forwards in an application;

FIG. 12 is a schematic illustration of moving backwards in, or closing, an application;

DESCRIPTION OF EMBODIMENTS AT PRESENT PREFERRED

Figure 1:
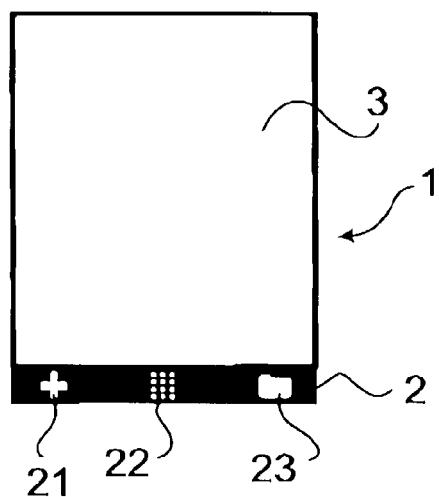
FIG. 1 is a schematic and highly simplified view of a touch sensitive area on a mobile handheld computer unit.

FIG. 1 illustrates a user interface for a mobile handheld computer unit. The user interface according to the present invention is specifically adapted to computer units comprising a touch sensitive area 1, which is divided into a menu area 2 and a display area 3. It should be understood that there are several different kinds of known touch sensitive displays and that the present invention to does not depend on what kind of touch sensitive display that is used in relation to the inventive user interface.

The computer unit is adapted to run several applications simultaneously and to present an active application on top of any other application on the display area 3. It should be understood that by simultaneously it is meant any technology that will make it appear to a user of the computer unit that applications are run simultaneously and that the present invention does not depend on how this is realised, whether it is through time-sharing of one processor, parallel use of several processors, or any other technique.

According to the present invention the menu area 2 is adapted to present a representation of a first 21, a second 22 and a third 23 predefined function.

The first function 21 is a general application dependent function, the second function 22 is a keyboard function, and the third function 23 is a task and file manager.

Figure 2:
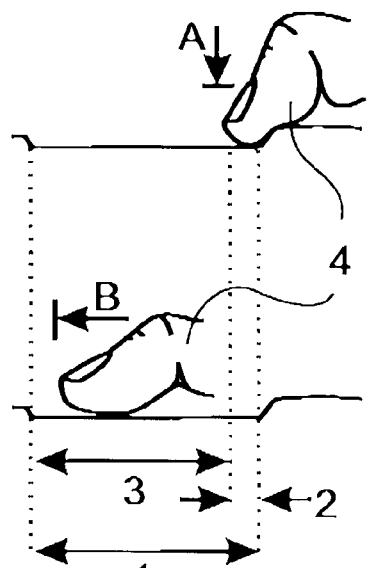
FIG. 2 is a schematic side view illustrating the activation of a function.

FIG. 2 shows that any one of these three functions 21, 22, 23 can be activated when the touch sensitive area 1 detects a movement of an object 4 with its starting point A within the representation of a function on the menu area 2 and with a direction B from the menu area 2 to the display area 3.

Figure 3:
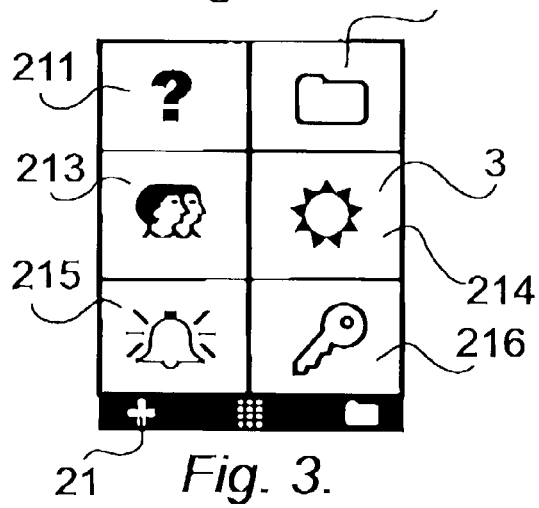
FIG. 3 is a schematic illustration of a first function.

FIG. 3 shows that if the first function 21 is activated, then the display area 3 is adapted to display icons 211, 212, 213, 214, 215, 216 representing services or functions depending on the current active application. One of the icons, in the figure exemplified by icon 211, always represents a "help"-service, regardless of application. Any key that, because of lack of space on the display area, or because the key should be hidden from the active application, or because of any other reason is not shown on the display area of an active application, can be represented by one of the icons 212, 213, 214, 215, 216 that is shown when the first function 21 is activated.

If for instance the active application handles a picture, then the icons that are shown when the first function is activated can be services such as "save to disk", "send as SMS", or "delete" and they can be settings such as "resolution", "colour", or "brightness".

If no application is currently active on the computer unit, then the icons 211, 212, 213, 214, 215, 216 are adapted to represent services or settings of the operations system of the computer unit, such as background picture, clock, alarm 215, users 213, help 211, etc.

Figure 4:
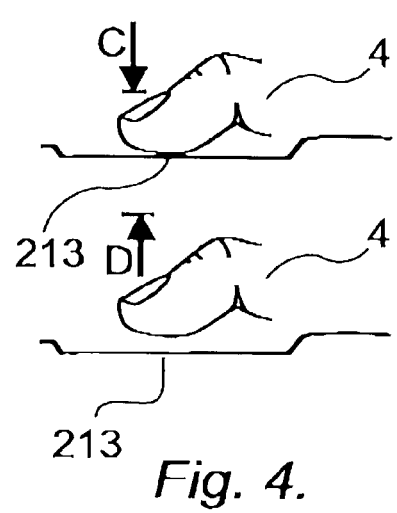
FIG. 4 is a schematic side view illustrating the selection of a service or setting represented by an icon.

FIG. 4 shows that selection of a preferred service or setting is done by tapping C, D on corresponding icon 213.

Figure 5:
FIG. 5 is a schematic illustration of a second function.
Figure 5:
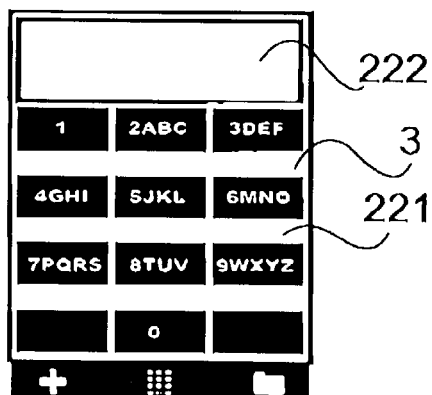

FIG. 5 shows that if the second function 22 is activated, then the display area 3 is adapted to display a keyboard 221 and a text field 222.

Two different scenarios can be at hand when this function key is activated. A first scenario can be that a text passage in the active application is highlighted as the second function is activated. If this is the case then the highlighted text passage is displayed in the text field 222 for editing through the keyboard 221.

The highlighted text passage is replaced by the edited text passage when the second function 21 is deactivated.

A second scenario can be that no text passage in the active application is highlighted. If this is the case then the text field 222 is available for inputting and editing of text through the keyboard 221.

In the case of the latter scenario, the first function 21 can be activated, or the second function 22 can be closed. If the second function 22 is closed then a choice of saving or deleting the inputted text is given, where the choice of saving the inputted text results in an activation of the first function 21.

As the first function 21 is activated with the second function 22 as currently active application the first function 21 will present services or settings available for the inputted text, such as saving the inputted text for later use, using the inputted text as telephone number in a telephone application, or sending the inputted text as message in communications application, such as e-mail, SMS, or fax.

Figure 6:
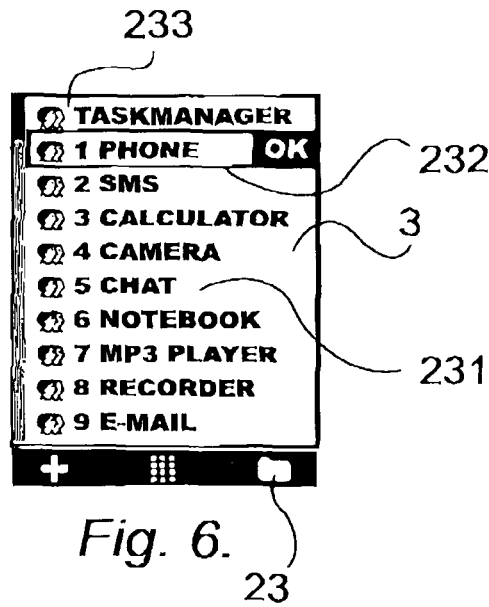
FIG. 6 is a schematic side view illustrating the selection of a third function.

FIG. 6 shows that if the third function 23 is activated, then the display area 3 is adapted to display a list 231 with a library of available applications and files on the computer unit.

A selection of an application will start the application, and a selection of a s file will open the file in an application intended for the file The name of a selected file can be edited by activation of the second function 22 as the file is highlighted.

Figure 7:
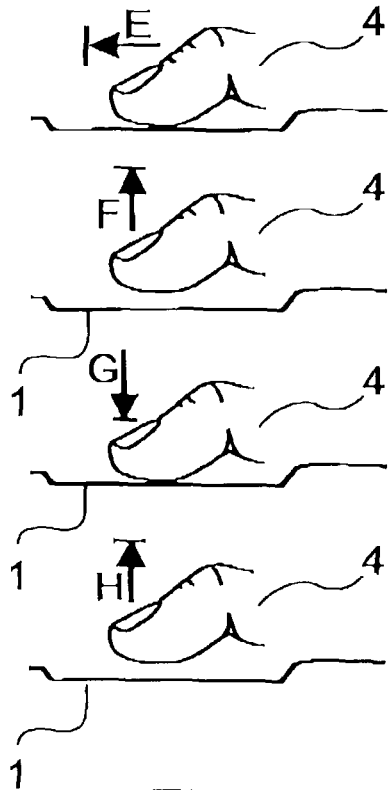
FIG. 7 is a schematic illustration of an application or file.

FIG. 7 shows that a selection of an application or a file is done by moving E the object 4 so that the representation of desired application or file is highlighted, removing F the object 4 from the touch sensitive area 1, and then tapping G, H on the touch sensitive area 1.

An application or file is highlighted by placing some kind of marking 232 on the representation of the application or file. This marking can be done in different ways, for example by putting a frame around the representation of the application or file, as shown in the figure, or by inverting the representation of the application or file.

It should be understood that all lists in the computer unit, such as a list of contact information in an address book, a list of e-mail messages in a mailbox, or a telephone log, can be managed in the above described manner.

The list 231 can be adapted to present only files or only applications. In this case, the top area of the list 231 can present a field 233 through which the content of the list 231 can be altered. If the list only presents files, then the field 233 can display a representation of a task manager and a selection of the field 233 will cause the list 231 to after to present only applications, and if the list 231 only presents applications, then the field 233 displays a representation of a file manager and a selection of the field 233 will cause the list 231 to after and present only files.

Figure 8:
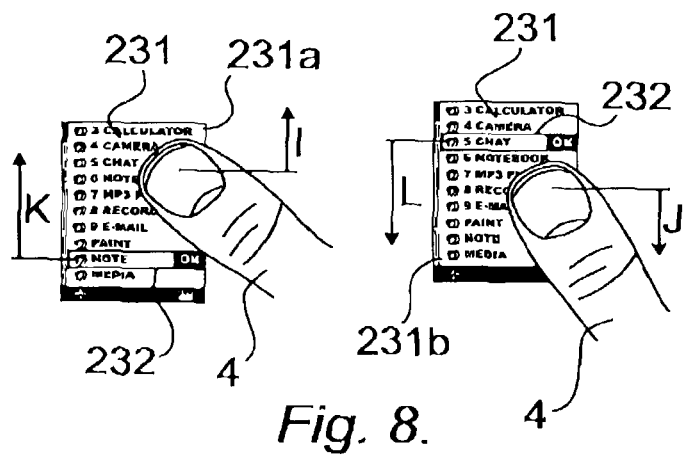
FIG. 8 is a schematic illustration on how navigation is performed.

FIG. 8 shows that navigation in the list is performed by moving the object 4 in a direction I towards the top 231a of the list 231 or towards J the bottom 231b of the list 231. This movement I, J of the object 4 will cause the marking 232 to move K, L in the same direction. The speed of the movement K, L of the marking 232 is lower than the speed of the movement I, J of the object 4.

FIG. 9 shows that if the number of applications and/or files in the list 231 exceeds the number of applications and/or files that can be presented on the display area 3, and if the object 4 is moved to the top or bottom position of the display area, then lifted, replaced on the display area, and then again moved to the top or bottom of the display area, then the content of the display area will be replaced one whole page, meaning that if the object 4 is positioned N at the bottom 3b of the display area 3, then lifted, replaced on the display area 3, and then again moved M to the bottom 3b of the display area 3, then the content 31 of the display area 3 will be replaced P by the following applications and/or files 32 in the list 231. In the same way, but not shown in the figure, if the object is positioned at the top of the display area, then lifted, replaced on the display area 3, and then again moved to the top of the display area, the content of the display area will be replaced by the preceding applications and/or files in the list.

FIG. 10 shows that if the object 4 is removed Q from a first position 33 on the display area 3 and then replaced R, S on a second position 34 on the display area 3, then the navigation can be continued T from the second position 34.

FIG. 11 shows that moving U the object 4 from the left of the display area 3 to the right of the display area 3 moves the active application, function, service or setting on one step forwards. FIG. 12 shows that, in a similar manner, the active application, function, service or setting is closed or backed one step by moving V the object 4 from the right of the display area 3 to the left of the display area 3.

As shown in FIG. 1, the menu area 2 is positioned at the bottom of the touch sensitive area 1. The representation of the first function 21 is positioned at the left side of the menu area 2, the representation of the second function 22 is positioned at the middle of the menu area 2, and the representation of the third function 23 is positioned at the right side of the menu area 2.

Figure 13:
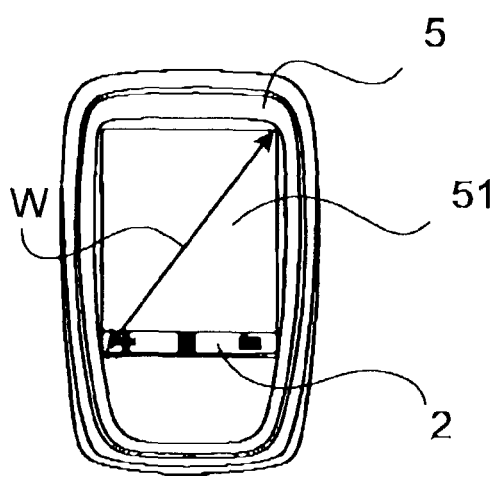
FIG. 13 is a schematic illustration of an enclosure

As shown in FIG. 13, the present invention relates to a user interface for a hand held mobile unit that preferably can be manageable with one hand. Hence the present invention teaches that the user interface is adapted to a touch sensitive area 1 with a size that is in the order of 2-3 inches, meaning the diagonal distance W between two corners of the touch sensitive area 1.

The user interface is adapted to be operated by one hand, where the object 4 can be a finger, such as the thumb shown in the figures, of a user of the computer unit. It should be understood though that the present invention might also be used with another object, such as a pen or other pointing device.

According to one preferred embodiment of the present invention the computer unit is covered with an enclosure 5, which is provided with an opening 51 for the display area 3, and where the representations of the menu area 2 is printed on top of the enclosure 5. It should be understood that the opening 51 might be a transparent part of the enclosure 5 or that it might be an open aperture depending on among other things technical considerations pertaining to the touch sensitive area 1.

This makes it possible to allow the enclosure 5 to be removable and exchangeable.

Figure 14:
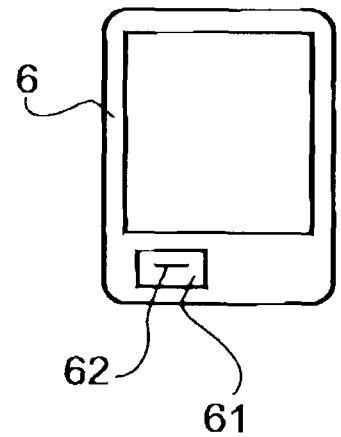
FIG. 14 shows a computer readable medium in the form of a solid state memory.

FIG. 14 shows a computer readable medium, in the figure schematically shown as a solid-state memory 61. A computer program product is stored within the computer readable medium. This computer program product comprises computer readable code 62, which, when read by a computer 6, will make it possible for the computer 6 to present a user interface according to the present invention.

The present invention also teaches that the computer program product is adapted to function as a shell upon an operations system.

It will be understood that the invention is not restricted to the aforedescribed and illustrated exemplifying embodiments thereof, and that these embodiments can be modified within the scope of the inventive concept illustrated in the accompanying claims.

The invention claimed is:

1. A non-transitory computer readable medium storing instructions, which, when executed by a processor of an electronic device having a touch-sensitive display screen, cause the processor to enable a user interface of the device, the user interface comprising at least two states, namely, (a) a tap-present state, wherein a plurality of tap-activatable icons for a respective plurality of pre-designated system functions are present, each system function being activated in response to a tap on its respective icon, and (b) a tap-absent state, wherein tap-activatable icons are absent but an otherwise-activatable graphic is present in a strip along at least one edge of the display screen for transitioning the user interface from the tap-absent state to the tap-present state in response to a multi-step user gesture comprising (i) an object touching the display screen within the strip, and (ii) the object gliding on the display screen away from and out of the strip.

2. The computer readable medium of claim 1, wherein any state transition elicited by a user gesture that begins at a location at which the otherwise-activatable graphic is provided, transitions to the tap-present state.

3. The computer readable medium of claim 1, wherein the tap-present state does not display the tap-activatable icons within a window frame.

4. The computer readable medium of claim 1, wherein the plurality of pre-designated system functions comprises a help function.

5. The computer readable medium of claim 1, wherein the plurality of pre-designated system functions comprises a clock function.

6. The computer readable medium of claim 1, wherein the plurality of pre-designated system functions comprises an alarm function.

7. The computer readable medium of claim 1, wherein the strip is less than a thumb's width wide within the display screen.

8. The computer readable medium of claim 1, wherein the multi-step user gesture comprises (i) the object touching the otherwise-activatable graphic, and (ii) the object gliding on the display screen away from and out of the strip.

* * * * *